US007613341B1

(12) United States Patent
Schuster

(10) Patent No.: US 7,613,341 B1
(45) Date of Patent: Nov. 3, 2009

(54) GAP DETECTION IN A DRAWING

(75) Inventor: Michael D. Schuster, Woodside, CA (US)

(73) Assignee: Adobe Systems Incorporated, San Jose, CA (US)

( * ) Notice: Subject to any disclaimer, the term of this patent is extended or adjusted under 35 U.S.C. 154(b) by 746 days.

(21) Appl. No.: 11/109,836

(22) Filed: Apr. 19, 2005

(51) Int. Cl.
*G06K 9/00* (2006.01)
(52) U.S. Cl. .................. 382/181; 345/441; 345/469.1; 345/581; 382/178; 382/267
(58) Field of Classification Search .......... 345/441, 345/442, 469.1, 581; 382/178, 179, 181, 382/267
See application file for complete search history.

(56) References Cited

U.S. PATENT DOCUMENTS 5,086,481 A * 2/1992 Yoshida et al. .............. 382/267
5,179,645 A * 1/1993 Tanimori .................... 345/441
5,600,735 A * 2/1997 Seybold ..................... 382/178
5,694,536 A * 12/1997 Gangnet et al. ............. 345/442
6,246,793 B1* 6/2001 Rindtorff et al. ............ 382/174
2006/0232603 A1* 10/2006 Schuster et al. ............. 345/619

OTHER PUBLICATIONS

John D. Hobby, "Practical Segment Intersection with Finite Precision Output", 1999, Bell Laboratories, pp. 1-17.*

* cited by examiner

*Primary Examiner*—Gregory M Desire
(74) *Attorney, Agent, or Firm*—Van Pelt, Yi & James LLP

(57) ABSTRACT

A technique for searching for a gap in a drawing is disclosed. The technique includes sweeping an evaluation line across at least a portion of the drawing, detecting on the evaluation line an endpoint of a first segment, determining a distance from the endpoint to a point on the second segment, comparing the distance to a maximum gap distance, and detecting a gap.

30 Claims, 11 Drawing Sheets

GAP DETECTION IN A DRAWING

BACKGROUND OF THE INVENTION

Drawings are used to visually express ideas on the web, in print or in other media. Drawings can be created and edited in software using various drawing applications. A typical drawing includes a plurality of paths that form regions, each of which might be filled with a color. Sometimes a region is not completely bounded by paths on all sides. For example, there may be a gap between two of the paths that enclose the region. Such gaps may not have been intended by the user. Some drawing applications search for gaps and close the gaps with a line when the region is filled. For example, a paint bucket tool could be used to fill the enclosed region, and the gaps are closed to prevent the paint from "leaking" out of the region. Existing gap detection methods include searching for candidate gaps using a small stamp, such as described by Gangnet (M. Gangnet, Automatic Gap Closing for Freehand Drawing, Siggraph (1994) Technical Sketch Submission), which is hereby incorporated by reference. Such methods can be computationally intensive and time consuming. An improved method of gap detection is needed.

BRIEF DESCRIPTION OF THE DRAWINGS

Various embodiments of the invention are disclosed in the following detailed description and the accompanying drawings.

DETAILED DESCRIPTION

Figure 1A:
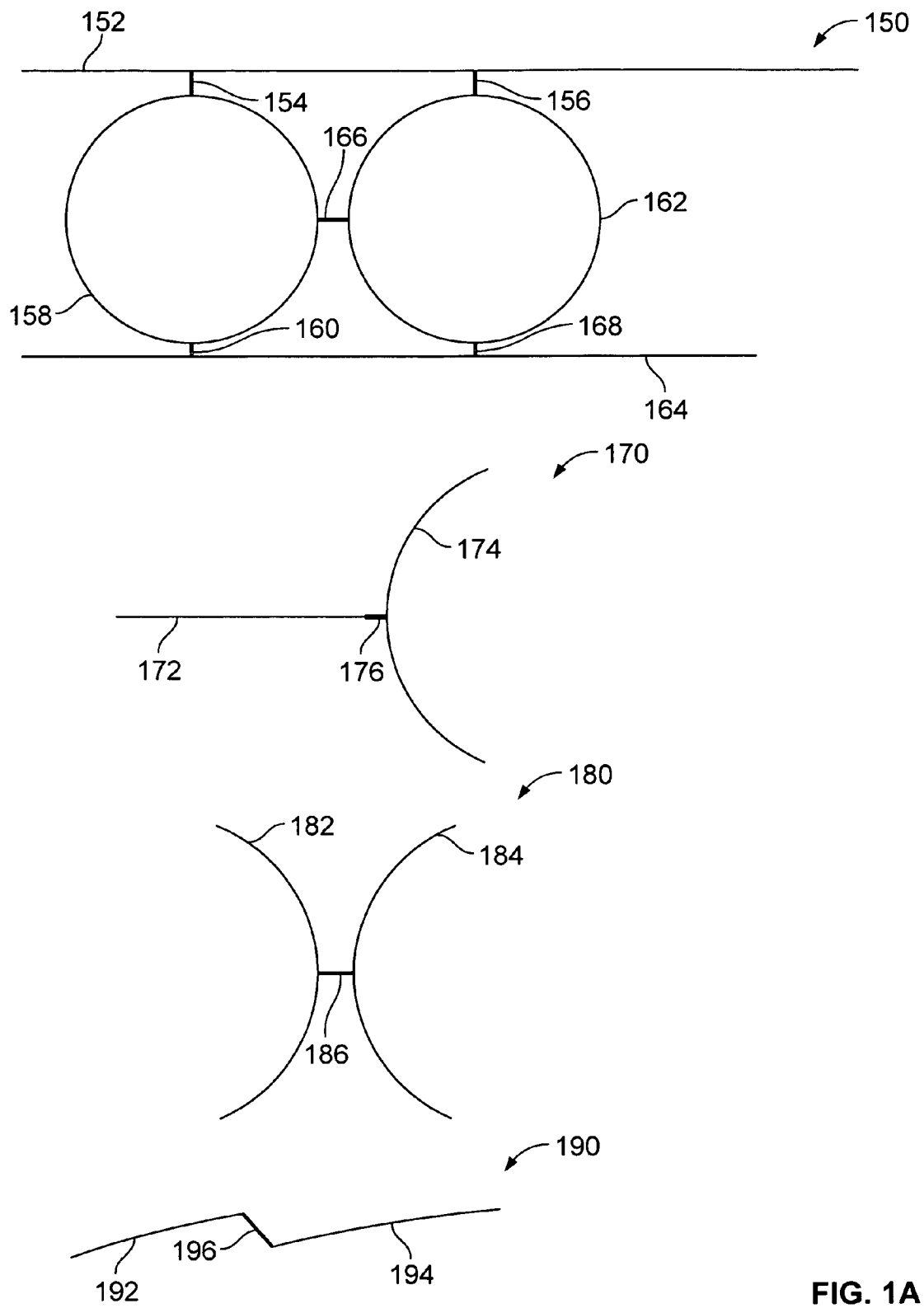
FIG. 1A is a drawing illustrating various examples of gaps.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

When a user creates a drawing, the drawing could include unintended gaps between paths in the drawing. In some embodiments, to search for gaps, an evaluation line is swept across the drawing. Endpoints that intersect with the evaluation line are detected. The distance between each endpoint and an intersection of a segment and the evaluation line is determined. When the distance is less than a maximum gap distance, a gap is detected. Gaps may be culled based on various criteria, such as aspect ratio or width of a shape defined by the gap line. Gap lines could be generated to close the gaps.

FIG. 1A is a drawing illustrating various examples of gaps. Drawing 150 is shown to include four paths 152, 158, 162, and 164. Paths 158 and 162 are ellipses that almost touch each other tangentially except for a gap between the two paths. Gap line 166 closes the gap between the two ellipses. A gap line, as used herein, comprises one or more paths or subpaths that close a gap in a drawing. A gap line can include a curve or a straight line. Closing a gap refers to generating a gap line at a location in the drawing such that the gap disappears. Path 152 is a line that almost touches paths 158 and 162. Gap line 154 closes the gap between paths 158 and 152. Gap line 156 closes the gap between paths 152 and 156. Path 164 is a line that almost touches paths 158 and 162. Gap line 160 closes the gap between paths 158 and 164. Gap line 168 closes the gap between paths 162 and 164.

Drawing 170 illustrates a gap between an endpoint and a path. In this example, the endpoint of path 172 almost touches path 174 except for a gap. Gap line 176 closes the gap between the endpoint of path 172 and path 174.

Drawing 180 illustrates a gap between two paths. In this example, path 182 and path 184 almost touch each other except for a gap. Path 182 and path 184 are curves that almost touch each other tangentially. Gap line 186 closes the gap between paths 182 and 184.

Drawing 190 illustrates a gap between two paths at their endpoints. In this example, the endpoint of path 192 and the endpoint of path 194 are separated by a gap 196. (As used herein, label numbers (e.g., 196) are used to denote both the gap and the gap line that closes the gap.) Gap line 196 closes gap 196 as shown.

Figure 1B:
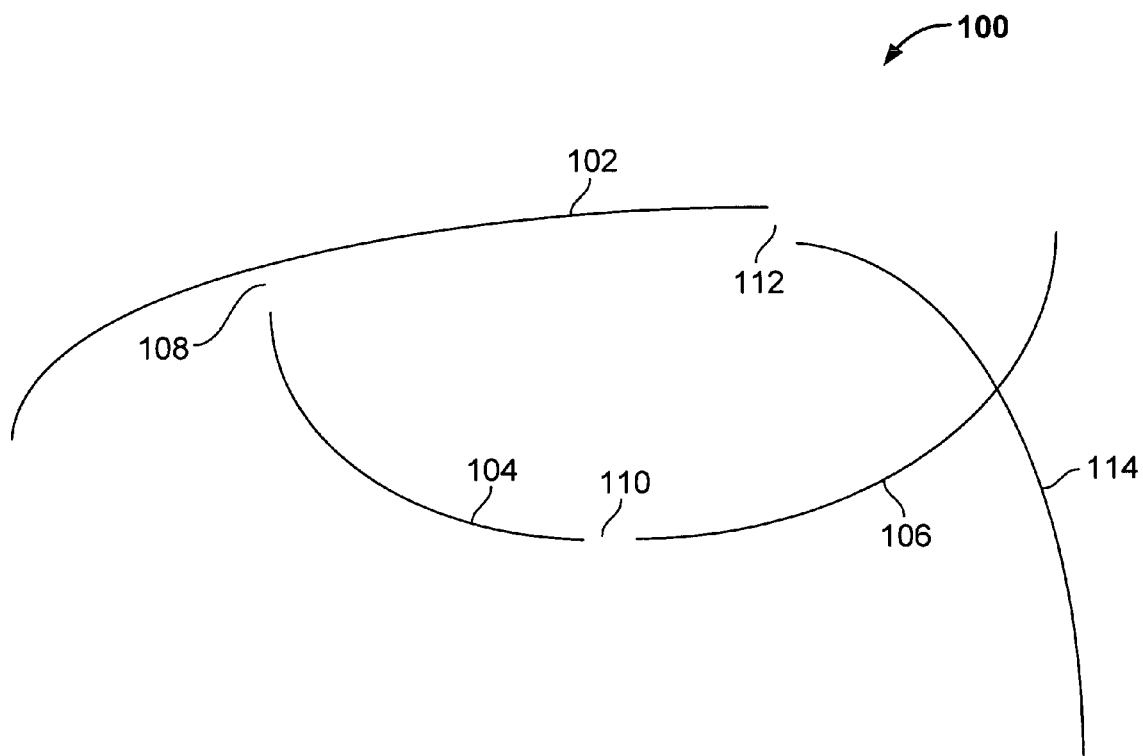
FIG. 1B is a drawing illustrating various types of gaps.

FIG. 1B is a drawing illustrating various types of gaps. In this example, drawing 100 is shown to include path 102, path 104, path 106, and path 114. The left endpoint of path 104 almost touches path 102 in the vertical direction. Gap 108 is a vertical gap between path 102 and the left endpoint of path 104. The right endpoint of path 104 and the left endpoint of path 106 almost touch in the horizontal direction. Gap 110 is a horizontal gap between the two endpoints. The right endpoint of path 102 and the left endpoint of path 114 almost touch in a diagonal direction. Gap 112 is the gap between path 102 and path 114. Gap 112 is neither a horizontal nor vertical gap.

Figure 2:
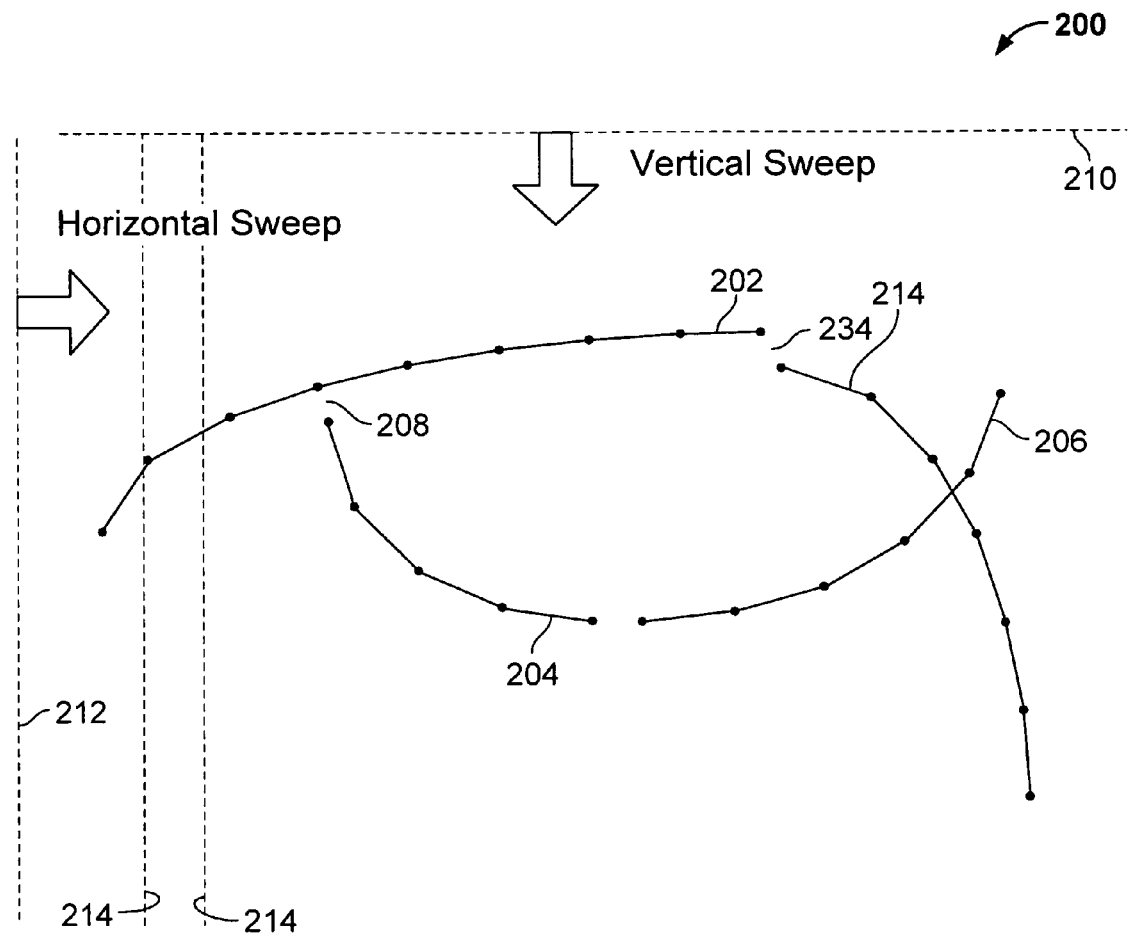
FIG. 2 is a diagram illustrating a drawing when searching for gaps.

FIG. 2 is a diagram illustrating a drawing when searching for gaps. In this example, drawing 200 is an approximation of drawing 100. Drawing 100 is approximated using straight line segments to form drawing 200. The points that define the straight line segments are selected to be within a certain tolerance error. The greater the number of points, the smaller the tolerance error. In some embodiments, the points include snap rounding points. For example, the Hobby snap rounding algorithm, as described by Hobby (Hobby, J., Practical Segment Intersection with Finite Precision Output, Computational Geometry 13 (1999), pp. 199-214), which is hereby incorporated by reference, could be used. In various embodiments, the snap rounding points could include intersections, endpoints, and/or color transition points (subpath endpoints where there is a color transition).

Drawing 200 is shown to include paths 202, 204, 206, and 214. In some embodiments, a plane sweep is used to search for gaps in the drawing. In some embodiments, a plane sweep is used to search for intersections and gaps in the drawing. For example, the plane sweep could include sweeping an evaluation line across the drawing and searching for gaps along the evaluation line. A vertical evaluation line 212 could be swept across the drawing horizontally to detect vertical gaps, such as gap 208 between path 202 and the left endpoint of path 204. A horizontal evaluation line 210 could be swept across the drawing vertically to detect horizontal gaps. In some embodiments, a gap that is neither horizontal nor vertical occurs when the gap is between two endpoints. Such gaps can be detected by sweeping an evaluation stripe 214 across the drawing, where the evaluation stripe comprises a pair of lines separated by a width equal to the maximum gap distance.

Figure 3:
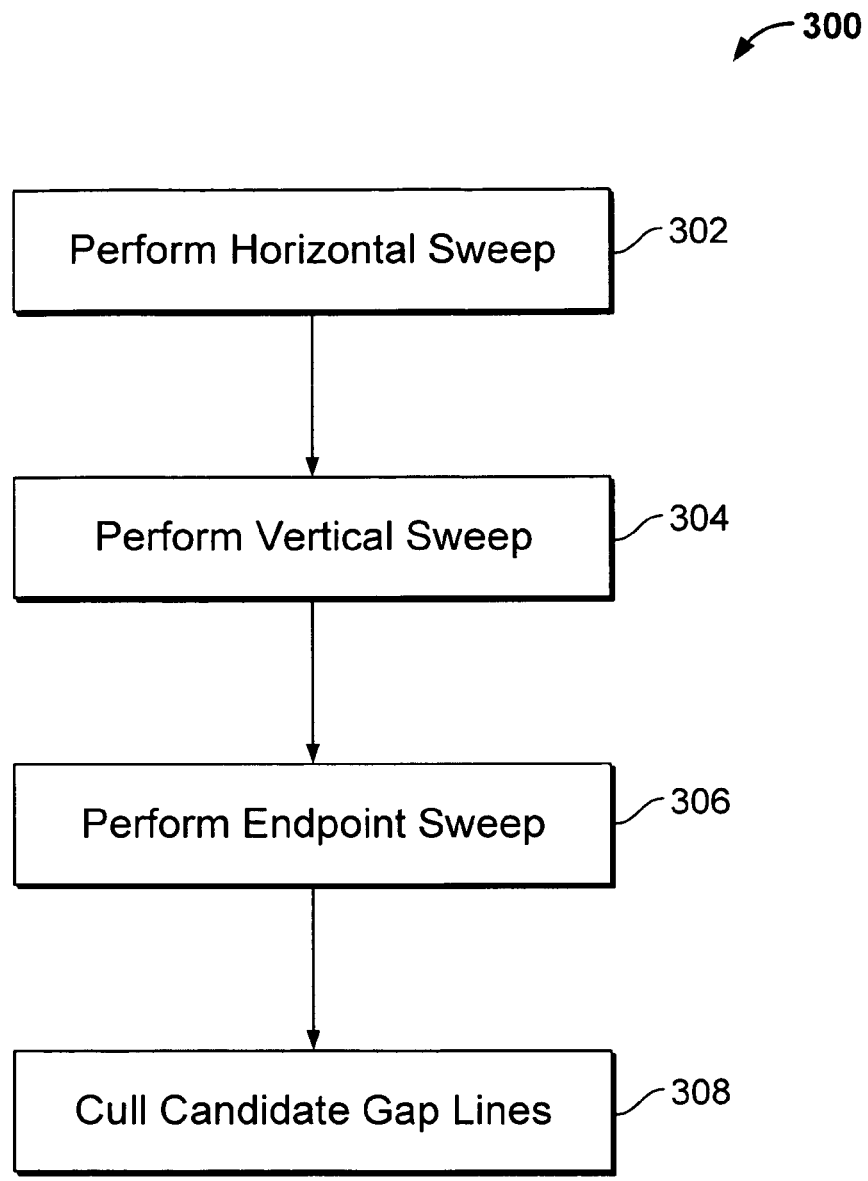
FIG. 3 illustrates an embodiment of a process for searching for gaps in a drawing.

FIG. 3 illustrates an embodiment of a process for searching for gaps in a drawing. For example, this process may be implemented on drawing 200 to detect gaps in the drawing. In the example shown, a horizontal sweep is performed (302). For example, vertical evaluation line 212 is swept horizontally across drawing 200 to detect vertical gaps. A vertical sweep is performed (304) For example, horizontal evaluation line 210 is swept vertically across drawing 200 to detect horizontal gaps. An endpoint sweep is performed (306). For example, evaluation stripe 214 is swept across drawing 200 to detect gaps between endpoints. Evaluation stripe 214 may be swept horizontally, vertically, or in any other direction in various embodiments. Optionally, the candidate gaps resulting from (302), (304), and (306) are culled (308). For example, closing some of the candidate gaps may actually close regions of the drawing that were not intended by the user to be closed. Further examples are discussed more fully below in conjunction with FIG. 5. In such cases, it may be desirable to cull one or more of the gaps. Various rules can be specified to cull candidate gaps. In some embodiments, the user can decide which candidate gaps to cull. In some embodiments, only the portion of the drawing affected by an edit is searched rather than the whole drawing.

Figure 4A:
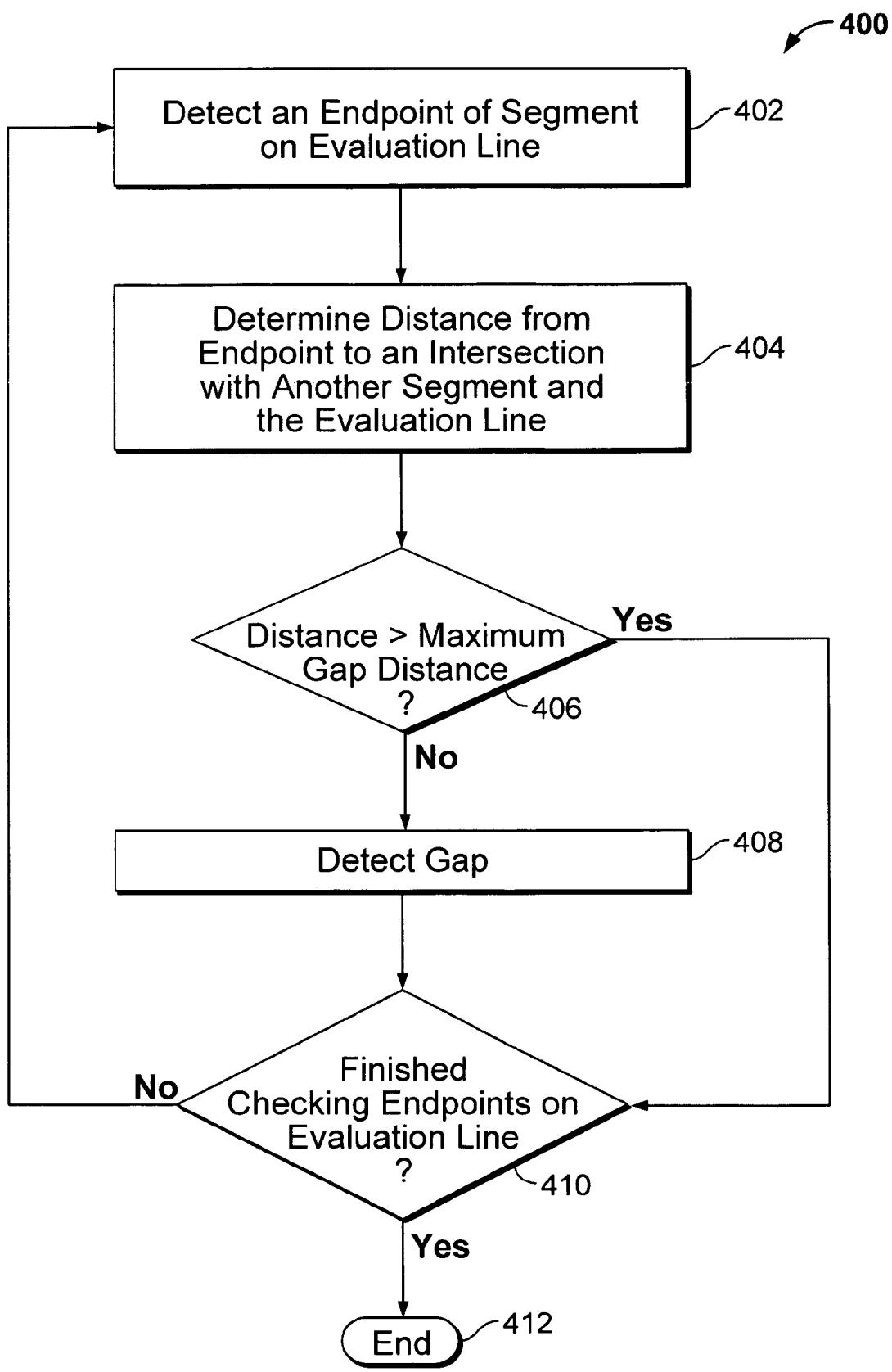
FIG. 4A illustrates an embodiment of a process for detecting gaps along an evaluation line.

FIG. 4A illustrates an embodiment of a process for detecting gaps along an evaluation line. For example, process 400 may be performed during a horizontal sweep (302), vertical sweep (304), or endpoint sweep (306) of the drawing. In some embodiments, evaluation locations are positioned at regular intervals across the drawing. In some embodiments, the evaluation locations are positioned near portions of the drawing affected by an edit. In some embodiments, evaluation locations are positioned at segment endpoints. The evaluation line is swept across the drawing. In some embodiments, only the portion of the drawing affected by an edit is swept rather than the whole drawing. At each evaluation location, process 400 is performed.

Figure 4B:
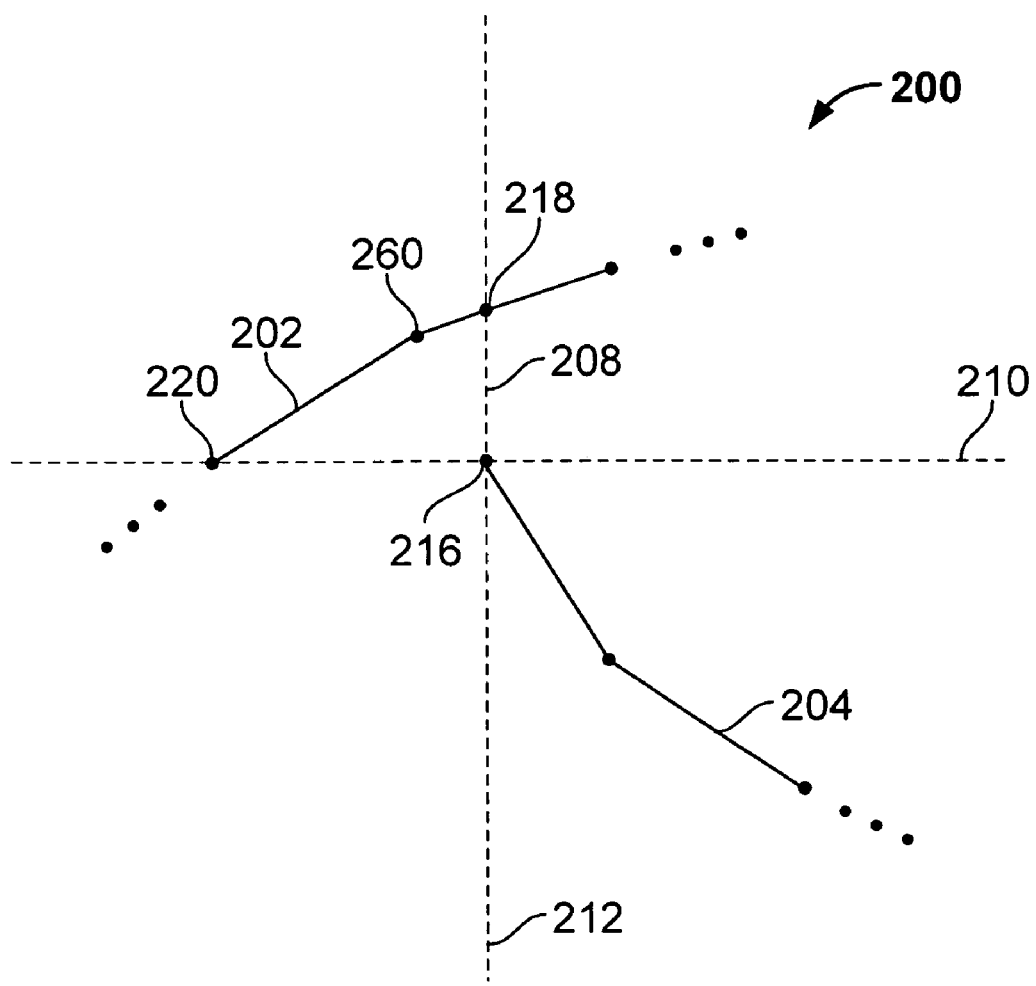
FIG. 4B illustrates an enlargement of a drawing around a gap.

In the example shown, an endpoint of a segment on the evaluation line is detected (402). In some embodiments, a gap always occurs at a segment endpoint. In other words, the gap is either between a segment endpoint and a path, or between two segment endpoints. The distance from the endpoint to an intersection with another segment on the evaluation line is determined (404). The distance could be determined in various ways. For example, FIG. 4B illustrates an enlargement of drawing 200 around gap 208. In this example, evaluation line 212 is positioned at the evaluation location shown. In this evaluation location, evaluation line 212 intersects endpoint 216 of the first segment of path 204. Evaluation line 212 intersects a segment of path 202 at point 218. The distance from the endpoint to an intersection with another segment on the evaluation line could be determined by calculating the distance between endpoint 216 and any point on the segment. For example, the distance could be determined by calculating the distance between endpoint 216 and the intersection of evaluation line 212 with the segment (point 218).

Alternatively, the distance could be determined by calculating the distance between the endpoint to any point on another segment. The other segment could be the nearest segment, another segment intersecting the evaluation line, or any other segment. For example, in drawing 200 the distance could be determined by calculating the distance between endpoint 216 and endpoint 260. In this case, endpoint 260 is the nearest point on the nearest segment to point 216. Endpoint 260 happens to be an endpoint, but the nearest point could be any point.

Returning to FIG. 4A, it is determined whether the distance is greater than the maximum gap distance (406). If the distance is not greater than the maximum gap distance, then a gap is detected (408). For example, in FIG. 4B, if the distance between endpoint 216 and point 218 is less than or equal to the maximum gap distance, then it is determined there is a vertical gap between endpoints 216 and 218. If the distance is greater than the maximum gap distance, the process continues at (410). It is determined whether there are other endpoints to check on the evaluation line (410). If there are other endpoints to check, the process returns to (402). If there are no other endpoints to check, the process ends (412). For example, in FIG. 4B, it is determined whether there are other endpoints besides endpoint 216 on evaluation line 212. In this case, there are no other endpoints on evaluation line 212 and the process ends. In some embodiments, evaluation line 212 is swept to the next evaluation location on drawing 200 and process 400 is performed again at that location.

In some embodiments, a gap can be discovered during a vertical sweep and a horizontal sweep. In such cases, it may be desirable to cull one or more of the gaps. For example, in FIG. 4B, evaluation line 210 is positioned at the evaluation location shown. In this evaluation location, evaluation line 210 intersects endpoint 216 of the first segment of path 204. Evaluation line intersects a segment of path 202 at the endpoint of that segment, endpoint 220. If the distance between endpoint 216 and endpoint 220, is less than or equal to the maximum gap distance, a horizontal gap is detected.

Figure 4C:
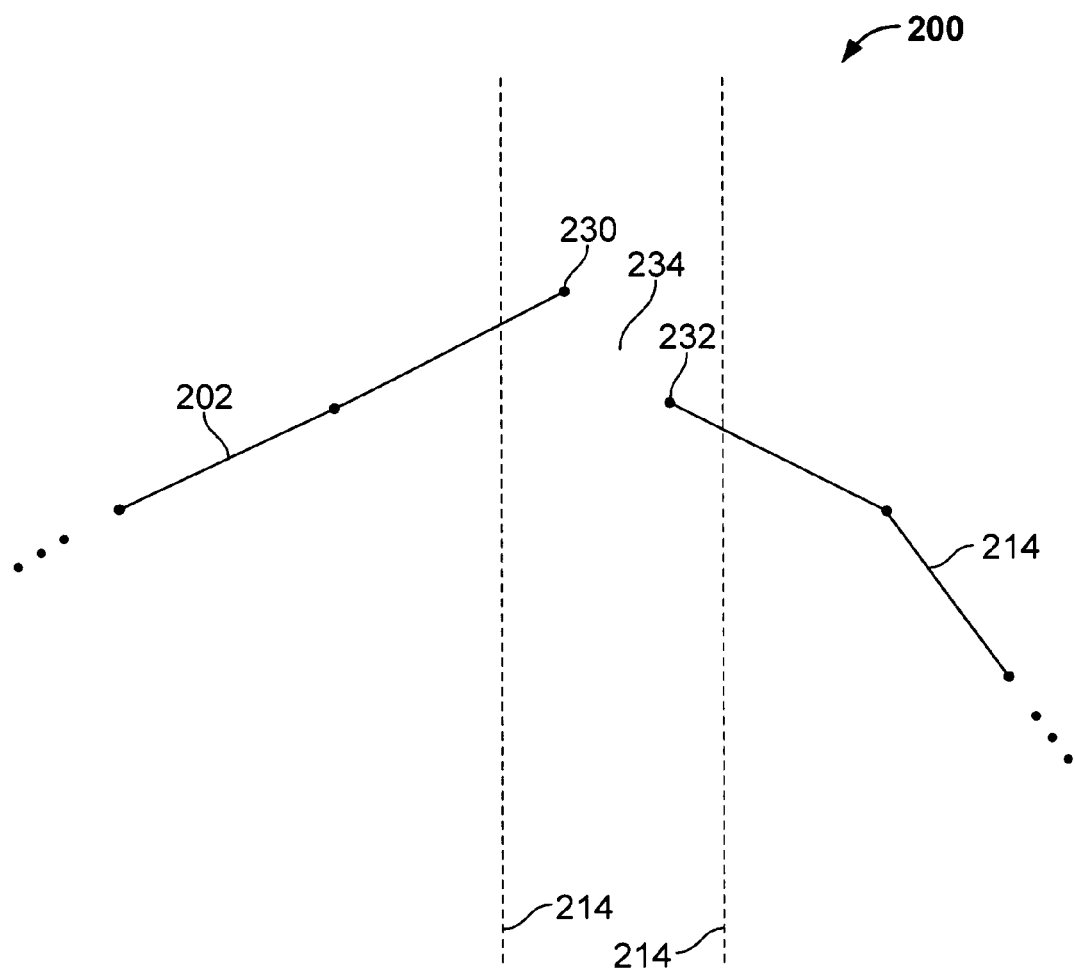
FIG. 4C illustrates an enlargement of a drawing around a gap.

In the case of an endpoint sweep (306), (402) and (404) of process 400 comprise detecting an endpoint within the evaluation stripe (402) and determining the distance from the endpoint to another endpoint within the evaluation stripe (404). For example, FIG. 4C illustrates an enlargement of drawing 200 around gap 234. In this example, evaluation stripe 214 is positioned at the evaluation location shown. In this evaluation location, endpoints 230 and 232 are located within evaluation stripe 214. The distance from the endpoint to another endpoint within the evaluation stripe is determined in this example by calculating the distance between endpoint 230 and endpoint 232. If the distance is not greater than the maximum gap distance, then a gap is detected (408).

Figure 5:
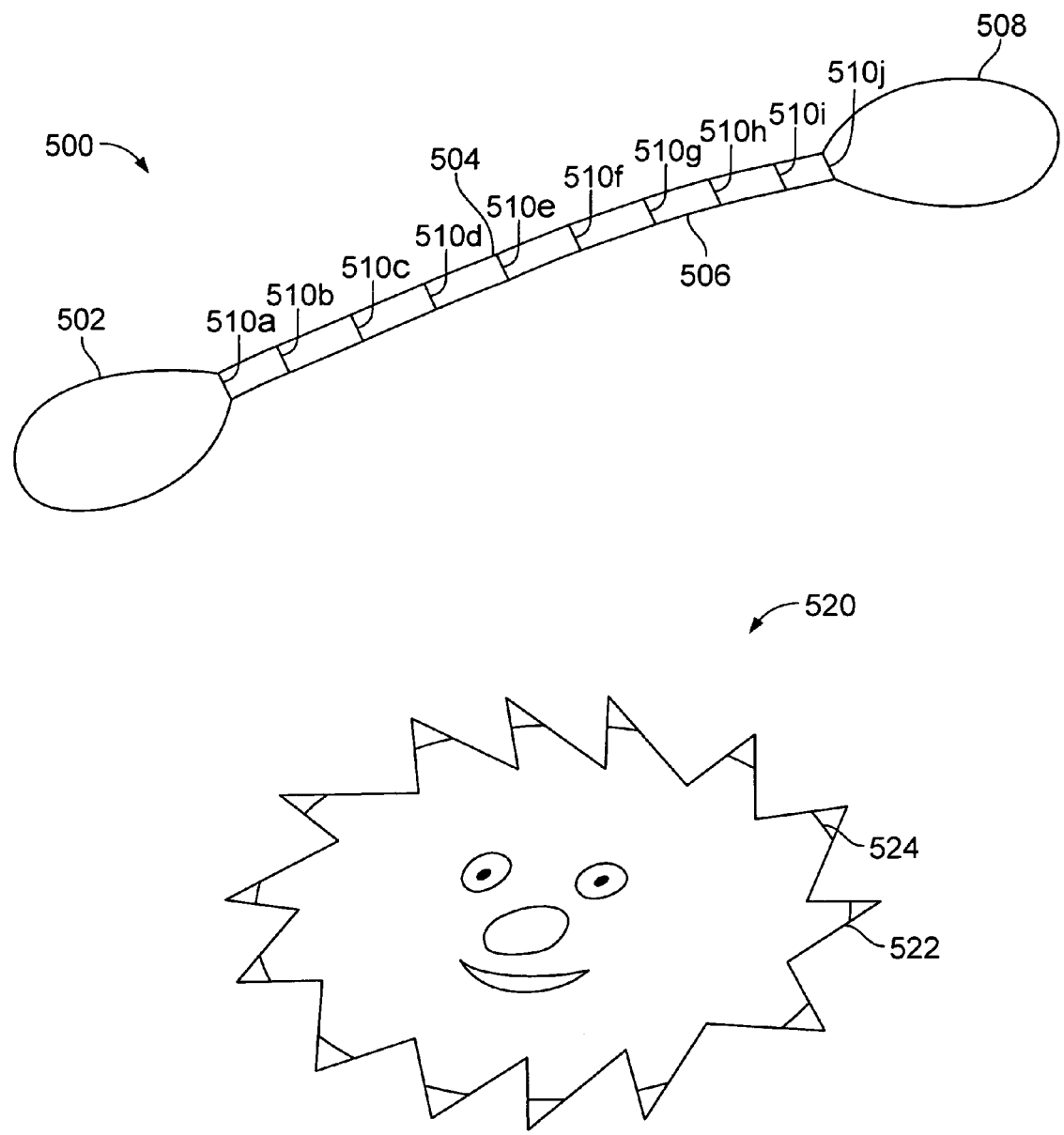
FIG. 5 illustrates various examples of candidate gaps that could be culled.

FIG. 5 illustrates various examples of candidate gaps that could be culled. Drawing 500 is shown to include paths 502,

504, 506, and 508, which form a dumbbell shape, in which paths 502 and 508 are the left and right ends of the dumbbell, respectively. Paths 504 and 506 are the top and bottom sides of the arm of the dumbbell, respectively. In this example, the candidate gaps after performing (302)-(306) on drawing 500 include gaps 510*a-j*. For each candidate gap, a candidate gap line can be generated to close the candidate gap. If the user wants to paint the dumbbell, it would require painting each of the regions along the dumbbell arm one at a time. In such cases, the user may not have intended for gaps 510*a-j* to be closed. As such, it may be desirable to cull one or more of these candidate gaps.

Drawing 520 is shown to include a plurality of paths to form a monster's face, including a jagged path 522 to depict the monster's fur. In this example, the candidate gaps after performing (302)-(306) on drawing 520 include a plurality of gaps along jagged path 522. For each candidate gap, a candidate gap line can be generated to close the candidate gap. If the user wants to paint the monster, it would require painting each of the triangles of fur one at a time. In such cases, the user may not have intended for these to be gaps to be closed. As such, it may be desirable to cull one or more of these candidate gaps.

Figure 6:
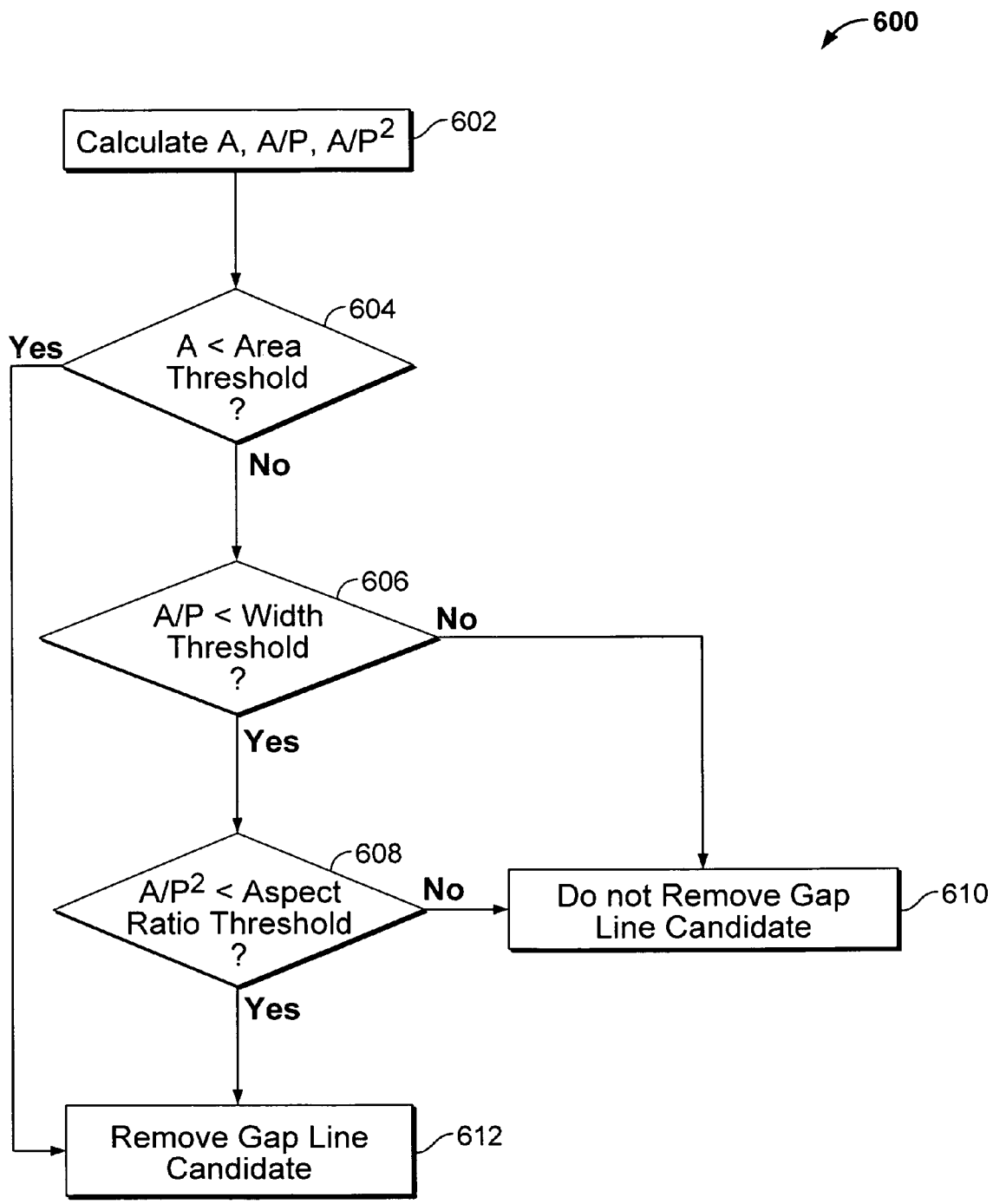
FIG. 6 illustrates an embodiment of a process for evaluating a candidate gap line for culling.

FIG. 6 illustrates an embodiment of a process for evaluating a candidate gap line for culling. For example, this process may be applied to each candidate gap in drawing 500 or 520 to cull candidate gaps found after performing (302)-(306) on drawing 500 or 520. In some embodiments, this process is used to perform (308) of FIG. 3.

Figure 7:
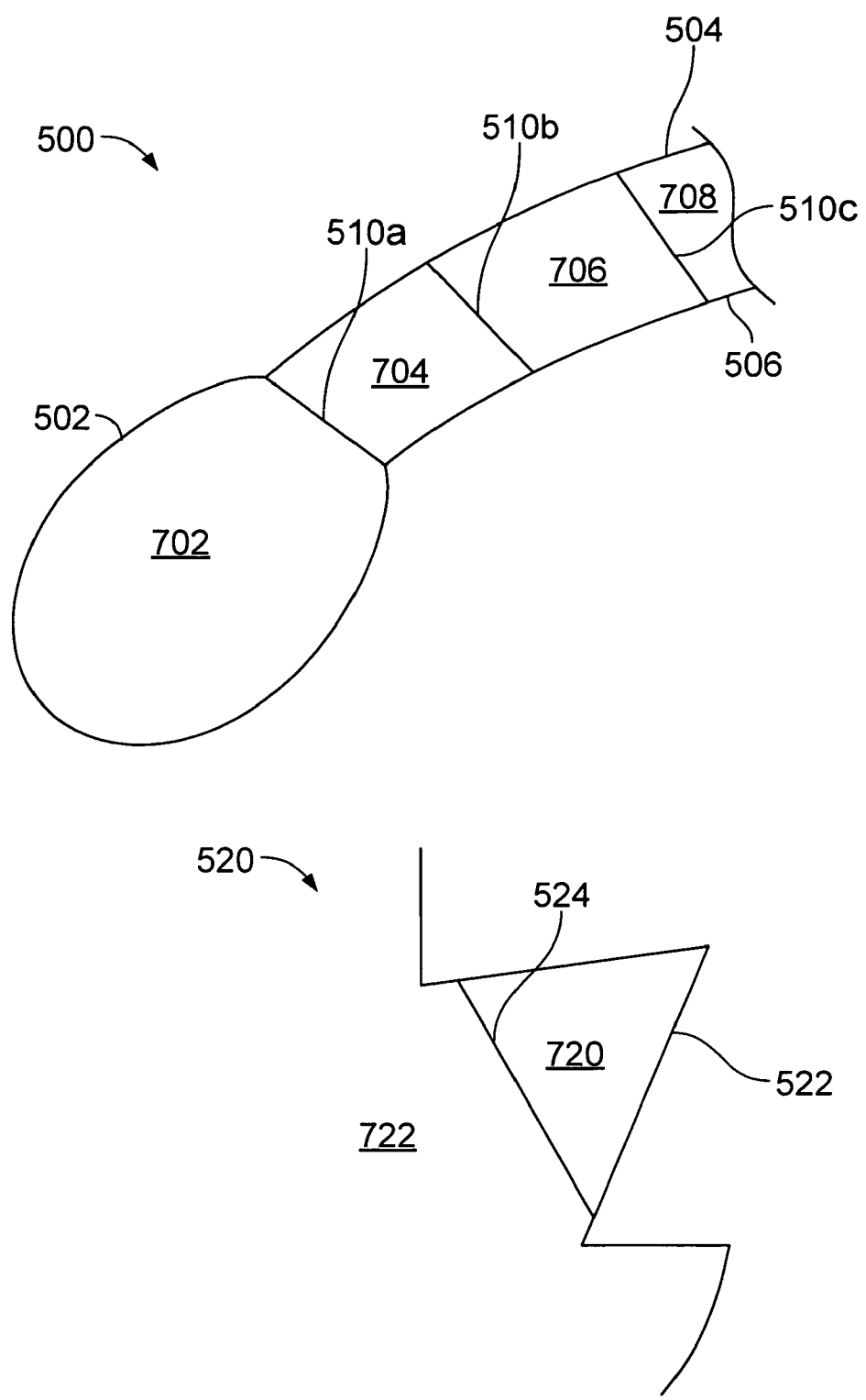
FIG. 7 illustrates an enlargement of a drawing around gaps.

For each candidate gap, a candidate gap line can be generated to close the candidate gap. The gap line borders a region on each side of the gap line. For example, FIG. 7 illustrates an enlargement of drawing 500 around gaps 510*a-c*. Candidate gap line 510*a* borders regions 702 and 704. Candidate gap line 510*b* borders regions 704 and 706. Candidate gap line 510*c* borders regions 706 and 708. In some embodiments, process 600 is performed for each region on each side of each candidate gap line.

Returning to FIG. 6, A, A/P, and A/P² are calculated (602). A is the area of the region. P is the perimeter of the region. For example, in FIG. 7, if process 600 is performed for candidate gap line 510*a* on region 702, A, A/P, and A/P² are calculated for region 702. It is determined whether A is less than the area threshold (604). The area threshold could be configured to have any appropriate value. If it is determined that A is less than the area threshold, then the gap line candidate (gap) is removed (612). For example, if the area of region 702 is less than the area threshold, then candidate gap 510*a* is removed. In other words, if the area that the candidate gap line encloses is too small, then that candidate gap is not considered a gap.

If A is not less than the area threshold, then it is determined whether A/P is less than the width threshold (606). The width threshold could be configured to have any appropriate value. If it is determined that A/P is not less than the width threshold, then the gap line candidate (gap) is not removed (610). For example, if A/P of region 702 is not less than the width threshold, then candidate gap 510*a* is not removed. In other words, if A/P of the region that the candidate gap line borders is large enough, then that candidate gap is considered a gap.

If A/P is less than the width threshold, then it is determined whether A/P² is less than the aspect ratio threshold. The aspect ratio threshold could be configured to have any appropriate value. If it is determined that A/P² is not less than the aspect ratio threshold, then the gap line candidate (gap) is not removed (610). For example, if A/P² of region 702 is not less than the aspect ratio threshold, then candidate gap 510*a* is not removed. In other words, if the aspect ratio of the region that the candidate gap line borders is large enough, then that candidate gap is considered a gap. If A/P² is less than the aspect ratio threshold, then that candidate gap is removed (612). For example, if both A/P and A/P² of region 702 are small enough, the gap line candidate is removed (612).

In some embodiments, when determining whether to cull candidate gap (line) 510*a*, process 600 is performed for both region 702 and region 704. In some embodiments, after process 600 is performed on drawing 500, candidate gaps 510*a-j* are removed. In some embodiments, candidate gaps 510*b-i* are removed and candidate gaps 510*a* and 510*j* are not removed.

In some embodiments, other rules can be specified to cull candidate gaps. For example, rather than calculating A, A/P, and A/P², other metrics can be used. For example, A/P can be replaced with width or height.

Figure 8:
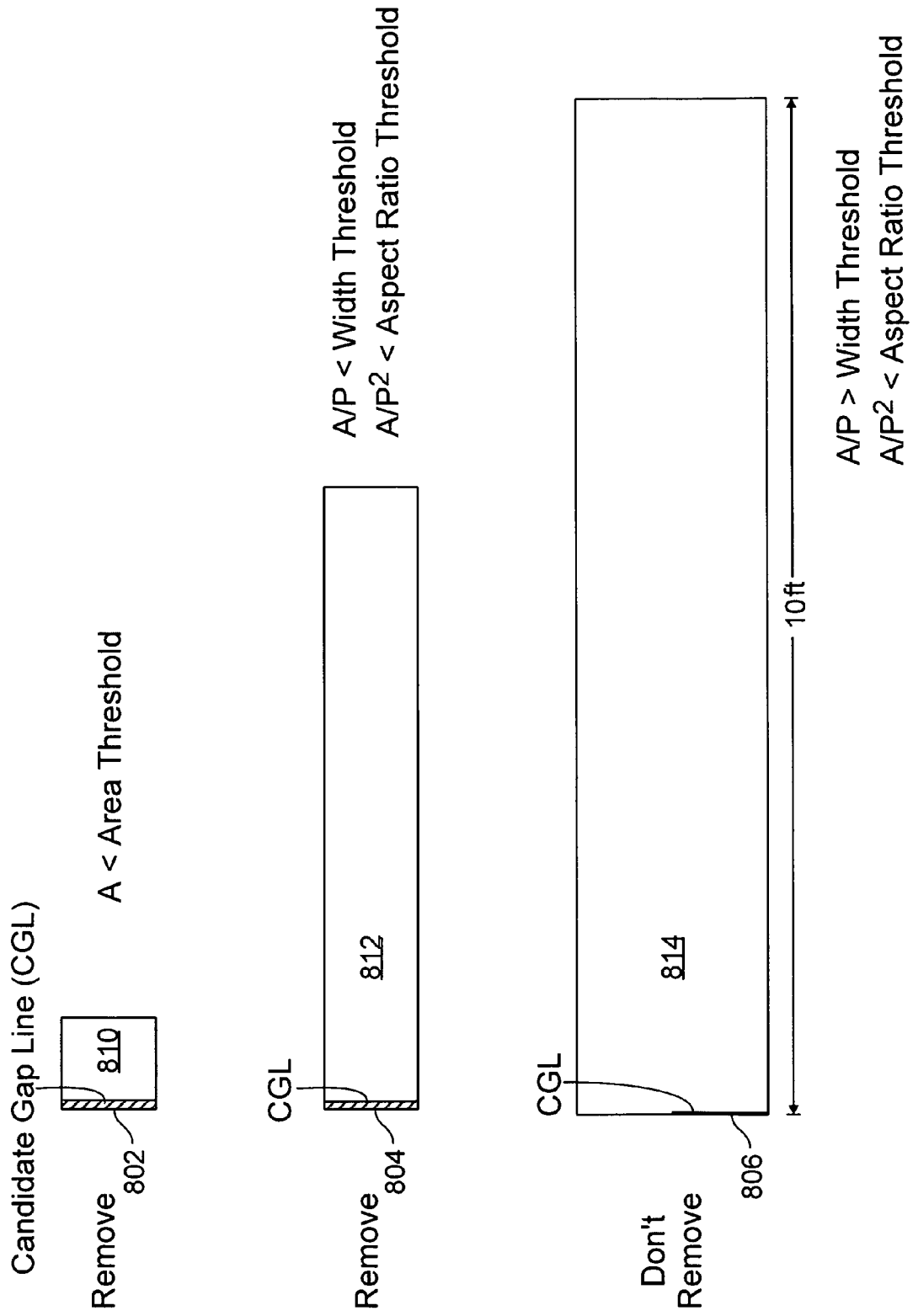
FIG. 8 illustrates various examples of drawings when evaluating a candidate gap line for culling.

FIG. 8 illustrates various examples of drawings when evaluating a candidate gap line for culling. This example shows how process 600 can be applied to various candidate gap lines. In this example, candidate gap lines 802, 804, and 806 are shown along with the region bordering the right side of these candidate gap lines. For purposes of explanation, the region on the left side is not shown, though in some embodiments, process 600 is also performed for the region on the left side of these candidate gap lines.

Candidate gap line 802 is shown to border region 810 on its right side. In this example, region 810 has a small width and height. Region 810 has an area that is less than the area threshold. Therefore, candidate gap line 802 is removed.

Candidate gap line 804 is shown to border region 812 on its right side. In this example, region 812 has a small height and a large width. A/P of region 812 is less than the width threshold. A/P² of region 812 is less (or greater) than the aspect ratio threshold. Therefore, candidate gap line 804 is removed.

Candidate gap line 806 is shown to border region 814 on its right side. In this example, region 814 has a small height and a very large (e.g., 10 feet) width. In this case, A/P of region 812 is not less than the width threshold. Therefore, candidate gap line 806 is not removed. A/P² of region 812 could be less than the aspect ratio threshold in this example.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of searching for a gap in a drawing, including:
   sweeping an evaluation line across at least a portion of the drawing;
   detecting on the evaluation line an endpoint of a first segment of a plurality of segments associated with a first path, wherein detecting is performed by a processor;
   determining a distance from the endpoint to a point on a second segment of a plurality of segments associated with a second path;
   comparing the distance to a maximum gap distance; and
   detecting a gap.

2. A method as recited in claim 1, wherein the second segment is the nearest segment to the evaluation line.

3. A method as recited in claim 1, wherein the second segment intersects with the evaluation line.

4. A method as recited in claim 1, wherein the point on the second segment is the intersection of the second segment with the evaluation line.

5. A method as recited in claim 1, wherein the point is an endpoint.

6. A method as recited in claim 1, wherein the point is the nearest point on the second segment to the endpoint.

7. A method as recited in claim 1, further including sweeping a second evaluation line across the drawing.

8. A method as recited in claim 1, wherein the evaluation line is swept vertically or horizontally.

9. A method as recited in claim 1, wherein a gap is detected when the distance is less than the maximum gap distance.

10. A method as recited in claim 1, wherein the segments are straight line segments.

11. A method as recited in claim 1, further including sweeping an evaluation stripe across the drawing.

12. A method as recited in claim 1, further including sweeping an evaluation stripe across the drawing, wherein the evaluation stripe has a width equal to the size of the maximum gap distance.

13. A method as recited in claim 1, further including sweeping an evaluation stripe across the drawing and detecting two endpoints within the evaluation stripe.

14. A method as recited in claim 1, further including sweeping an evaluation stripe across the drawing and detecting a gap.

15. A method as recited in claim 1, further including culling at least one gap.

16. A method as recited in claim 1, further including culling a gap based on the area of a shape on one side of the gap.

17. A method as recited in claim 1, further including culling a gap based on an aspect ratio of a shape on one side of the gap.

18. A method as recited in claim 1, further including culling a gap based on a width calculation of a shape on one side of the gap.

19. A method as recited in claim 1, further including closing the gap with a gap line.

20. A method as recited in claim 1, wherein a portion of the drawing affected by an edit is searched.

21. A system for searching for a gap in a drawing, including:
a processor configured to:
sweep an evaluation line across at least a portion of the drawing;
detect on the evaluation line an endpoint of a first segment of a plurality of segments associated with a first path;
determine a distance from the endpoint to a point on a second segment of a plurality of segments associated with a second path;
compare the distance to a maximum gap distance; and
detect a gap; and
a memory coupled with the processor, wherein the memory provides the processor with instructions.

22. A system as recited in claim 21, wherein the second segment is the nearest segment to the evaluation line.

23. A system as recited in claim 21, wherein the second segment intersects with the evaluation line.

24. A system as recited in claim 21, wherein the processor is further configured to sweep a second evaluation line across the drawing.

25. A system as recited in claim 21, wherein the evaluation line is swept vertically or horizontally.

26. A system as recited in claim 21, wherein a gap is detected when the distance is less than the maximum gap distance.

27. A system as recited in claim 21, wherein the processor is further configured to sweep an evaluation stripe across the drawing.

28. A system as recited in claim 21, wherein the processor is further configured to cull at least one gap.

29. A system as recited in claim 21, wherein the processor is further configured to close the gap with a gap line.

30. A computer program product for searching for a gap in a drawing, the computer program product being embodied in a tangible computer readable medium and comprising computer instructions for:
sweeping an evaluation line across at least a portion of the drawing;
detecting on the evaluation line an endpoint of a first segment of a plurality of segments associated with a first path;
determining a distance from the endpoint to a point on a second segment of a plurality of segments associated with a second path;
comparing the distance to a maximum gap distance; and
detecting a gap.

* * * * *

UNITED STATES PATENT AND TRADEMARK OFFICE
CERTIFICATE OF CORRECTION

PATENT NO.       : 7,613,341 B1                                    Page 1 of 1
APPLICATION NO.  : 11/109836
DATED            : November 3, 2009
INVENTOR(S)      : Michael D. Schuster It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1184 days.

Signed and Sealed this

Nineteenth Day of October, 2010

David J. Kappos
*Director of the United States Patent and Trademark Office*